United States Patent [19]

Hara et al.

[11] Patent Number: 5,588,523
[45] Date of Patent: Dec. 31, 1996

[54] ROLLER DRIVING DEVICE

[75] Inventors: Shoji Hara; Takenori Yanai, both of Kounan; Kazuhiro Ishikawa, Inuyama, all of Japan

[73] Assignee: Murata Kikai Kabushiki Kaisha, Kyoto, Japan

[21] Appl. No.: 350,531

[22] Filed: Dec. 7, 1994

[30] Foreign Application Priority Data

Dec. 10, 1993 [JP] Japan ................................ 5-341480

[51] Int. Cl.⁶ ..................................................... B65G 13/06
[52] U.S. Cl. ................................ 198/781.08; 198/781.06
[58] Field of Search ............................ 198/781.06, 781.08

[56] References Cited

U.S. PATENT DOCUMENTS 3,225,893  12/1965  Currie ............................ 198/781.08 X
3,718,248   2/1973  Muller ............................. 198/781.08
3,840,110  10/1974  Molt et al. ........................ 198/781.06
3,960,262   6/1976  Henig ........................... 198/781.06 X
4,164,998   8/1979  DeGood et al. ................... 198/781.06
4,278,166   7/1981  Pirro, Jr. ....................... 198/781.08 X
4,453,627   6/1984  Wilkins .......................... 198/781.06
4,854,445   8/1989  Eaton et al. ..................... 198/781.06

FOREIGN PATENT DOCUMENTS 8500265  8/1986  Netherlands ...................... 198/781.08

Primary Examiner—David A. Bucci
Attorney, Agent, or Firm—Armstrong, Westerman, Hattori, McLeland & Naughton

[57] ABSTRACT

The rotation of transmitting rollers can be transmitted to carrier rollers by making the transmission rollers contact with the carrier rollers paired in the front and rear direction by moving bearing member toward the upper side, whereas the rotation of the transmission rollers can be prevented from transmission to the carrier rollers by separating the transmission rollers from the carrier rollers by moving the bearing members to the lower side.

4 Claims, 3 Drawing Sheets

ROLLER DRIVING DEVICE

BACKGROUND OF THE INVENTION

1. Field of the Invention

This invention relates to a roller driving device for a roller conveyor.

2. Related Art Statement

The following is known for a conventional roller conveyor. It has a base frame, a large number of rollers which are installed on the base frame rotatably so that their central axes are arranged in side to side relation, wheels which are fixed to shaft portions of the rollers, and an endless driving chain which hangs over these wheels, and the rollers are rotated by driving the driving chains.

There is the following drawback in the conventional roller conveyor. All the rollers are rotated by the single endless driving chain, and, therefore, it is not possible to divide the roller conveyor at predetermined intervals in the transporting direction or to stop only the rollers belonging to the divided zones.

Of course, it is possible to install a motor and an endless driving chain for each zone to thereby stop only the rollers of the divided zones. However, as such a case, there is the drawback of high cost since motors are necessary for the respective zones.

SUMMARY OF THE INVENTION

It is an object of the present invention to provide a roller driving device of a roller conveyor wherein the rotation of only predetermined rollers can simply be stopped.

According to the present invention, there is provided a roller driving device comprising:

carrier rollers;

a driving rotation shaft disposed at the lower side of the carrier rollers and being orthogonal to central axes thereof of the rollers;

transmission rollers installed at the lower side of the carrier rollers in a vertically movable fashion which are capable of coming into contact with and separating from the carrier rollers;

wheels concentric with the transmission rollers and fixed thereto; and endless belts each extend around each wheel and the driving rotation shaft.

This invention provides the following operation.

The carrier rollers can be rotated by pushing the transmission rollers to come into contact with the carrier rollers, thereby transmitting the rotation of the driving rotation shaft to the carrier rollers through the transmission rollers.

On the other hand, the rotation of the carrier rollers can be stopped by preventing the transmission rollers from coming contact with the carrier rollers.

Further, as shown in a later example, this invention can preferably be used in a roller conveyor, and the like, having a mechanism wherein by combining it with an object detector, or the like, the succeeding object is stopped before an object in the midst of transportation collides with the preceding object from behind, that is, the succeeding object does not push the preceding object, or collide with the preceding object.

DETAILED DESCRIPTION OF PREFERRED EMBODIMENT

Figure 1:
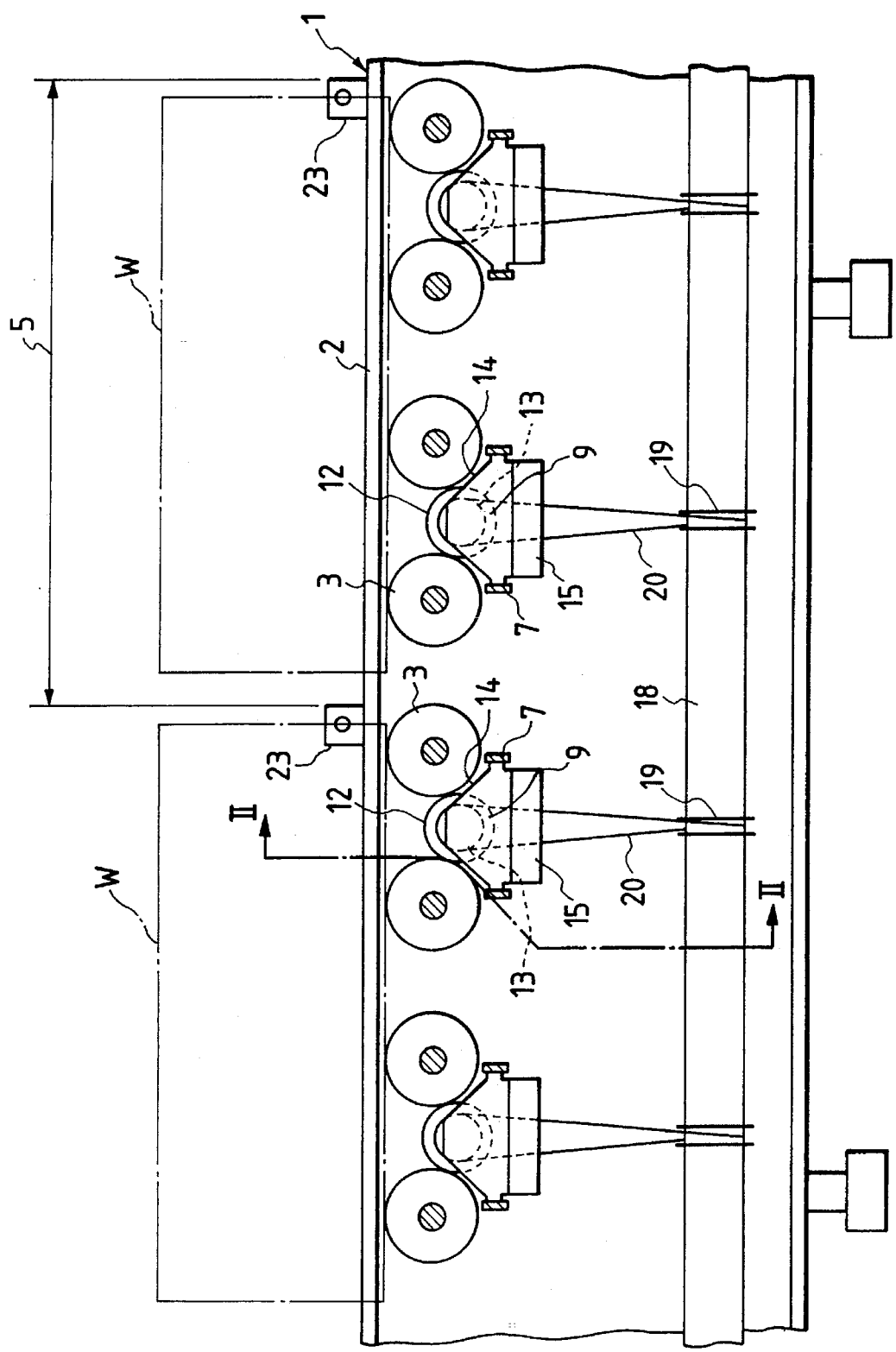
FIG. 1 is a sectional side view of important parts showing an example of the present invention.
Figure 2:
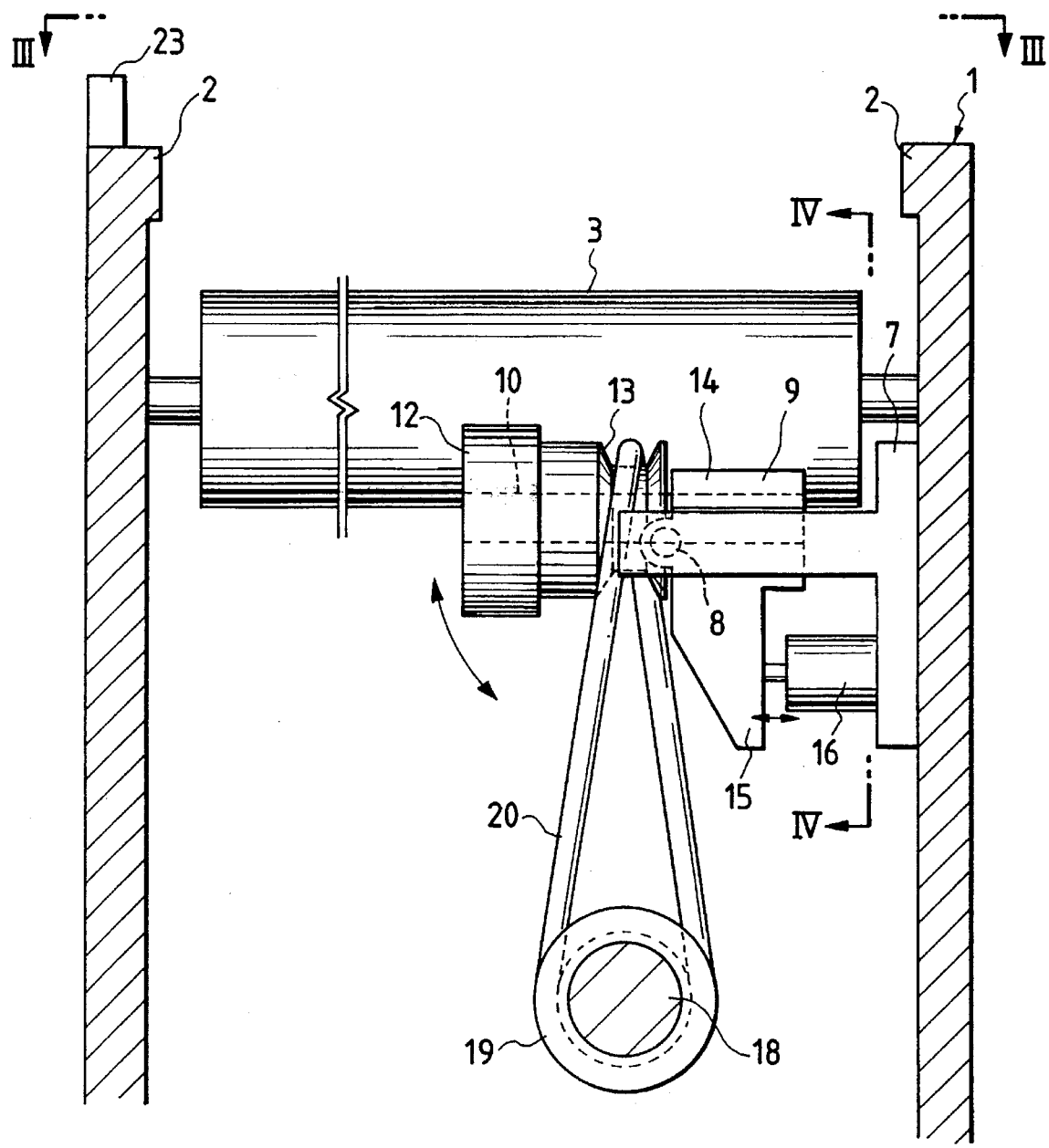
FIG. 2 is a magnified sectional view taken along the line II—II of FIG. 1 omitting the intermediary portion.
Figure 3:
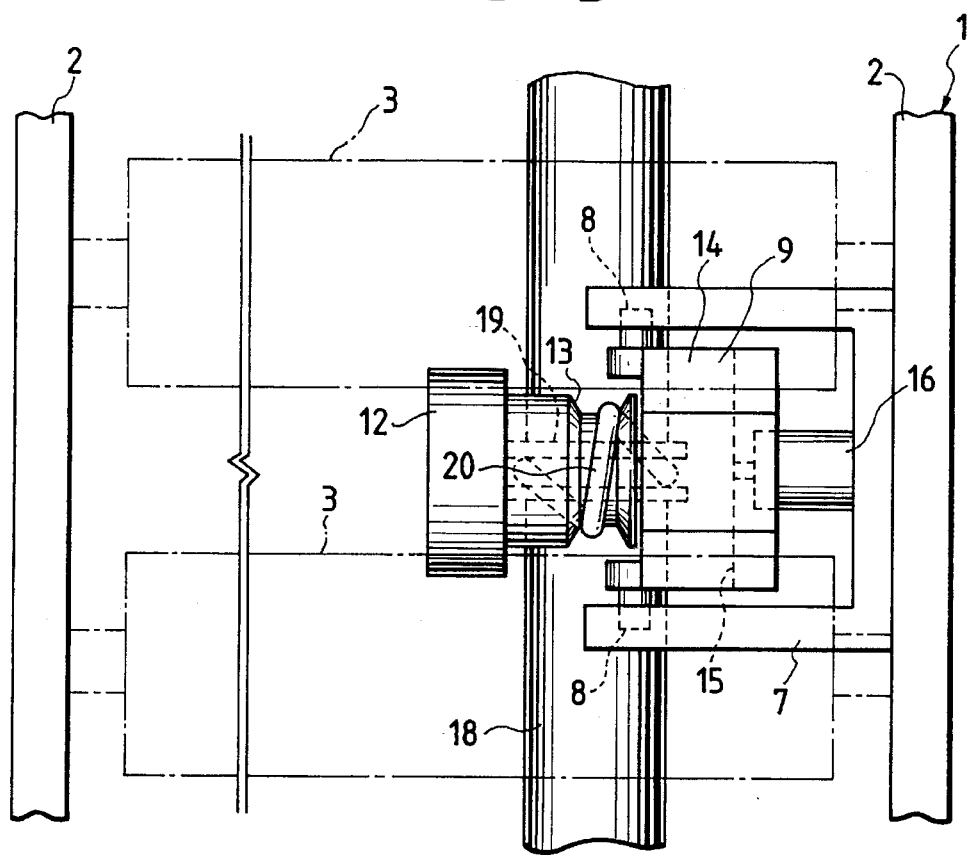
FIG. 3 is a partially cutaway plan view taken in the direction of the arrow along the line III—III of FIG. 2.
Figure 4:
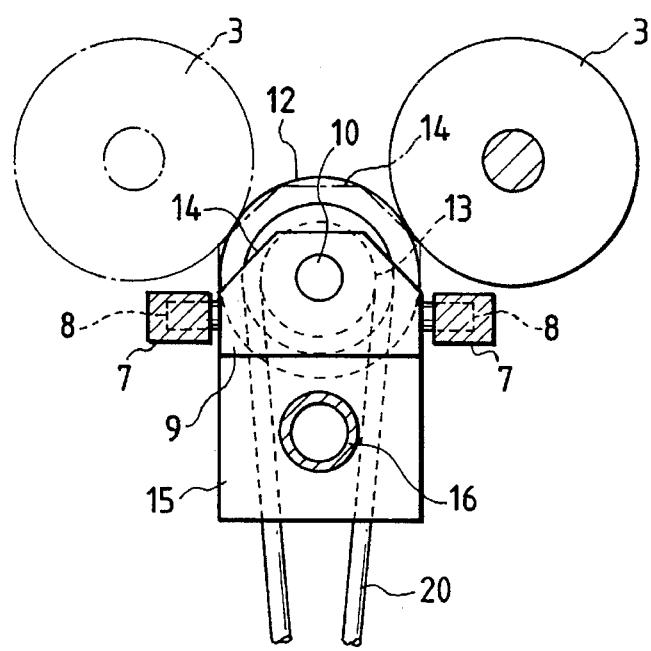
FIG. 4 is a sectional view taken along the line IV—IV of FIG. 2.

An explanation will be given of this invention based on examples shown in the drawings as follows. In this specification, "front" signifies the right side of FIG. 1, "rear" signifies the left side thereof, "left" signifies the rear side of the paper of FIG. 1, and "right" signifies the top side thereof.

As shown in FIG. 1, a roller conveyor 1 has a base frame 2 and a large number of carrier rollers 3 which are rotatably installed at predetermined intervals in the front and rear direction so that the central axes are arranged in the base frame 2 in the left and right direction.

The roller conveyor 1 has a plurality of zones 5 which are divided along the transporting direction at predetermined intervals each of which is longer than an object W, and each zone 5 has four carrier rollers 3.

The front and rear two of the carrier rollers 3 in each of the zone 5 are paired and each brackets 7 is fixed to the base frame 2 at the lower side between the paired carrier rollers 3. Bearing members 9 are supported on the brackets 7 being vertically movable by pivotal shafts 8 each of whose center axis is arranged in the front and rear direction. Driver rotation shafts 10 are rotatably fitted to the bearing members 9 so that the central axis of each driven rotation shaft 10 is arranged in the left and right direction and each central axis is disposed between the central axes of the carrier rollers 3. A transmission roller 12 and wheel 13 are fitted to the driven rotation shaft 10. Under this construction, when the bearing member 9 is moved to the upper side and the transmission roller 12 comes into contact with the paired carrier rollers 3, the rotation of the transmission roller 12 can be transmitted to the paired carrier rollers 3. On the other hand, when the bearing member 9 is moved to the lower side and the transmission roller 12 is separated from the carrier rollers 3, the rotation of the transmission roller 12 cannot be transmitted to the carrier rollers 3.

In this example, the transmission roller 12 comes into contact with the paired carrier rollers 3, whereby each of the paired carrier rollers 3 can be rotated by a single transmission roller by which the number of the transmission roller 12 can be reduced. However, a single carrier roller 3 can be rotated by a single transmission roller 12 by providing the transmission roller 12 directly under the carrier roller 3.

A brake shoe 14 is formed on the upper face of the bearing member 9 at the opposite side of the transmission roller 12 with the pivotal shaft 8 to be a center thereof. When the transmission roller 12 moves toward the lower side and does not have contact with the carrier roller 3, the brake shoe 14 moves toward the upper side about the pivotal shaft 8, comes into contact with the carrier rollers 3 and prevents the rotation of the carrier rollers 3.

An operating member 15 is installed at the lower portion of the bearing member 9 depending therefrom, and the transmission roller 12 can move into contact with the carrier roller 3 when an operating device 16, such as a linear solenoid which is installed at the base frame 2, pushes the operating member 15 at a portion which is below than the pivotal shaft 8. When the operating piece member 15 is not pushed by the operating device 16, the transmission roller 12 is separated from the carrier roller 3 by its own weight and the tension of an endless belt 20.

When the transmission roller 12 does not come into contact with the carrier rollers 3, as stated above, the brake shoe 14 comes into contact with the carrier rollers 3 thereby preventing the rotation of the carrier roller 3. That is, by this construction, either the carrier roller 3 is rotated or, alternatively the rotation thereof is prevented by means of the single operating device 16.

As shown in FIG. 1, at the front position of each zone 5 in the base frame 2, an object detector 23 is installed. As the object detector 23, a penetrating or a reflecting type sensor, or the like, using signals of light, electric wave, acoustic wave, or the like, or a mechanical switch which is activated by contact with the object W, can be employed. When the object W is detected by the object detector 23, all the operating devices 16 belonging to the zones 5 succeeding to the zone 5 to which the object detector 23 belongs are in a nonoperating state (a state in which the operating piece member 15 is not pushed to the left side), and the transmission rollers 12 are in a state wherein they do not come into contact with the carrier rollers 3. On the other hand, when the object W is not detected by the object detector 23, the operating devices 16 are in an operating state (a state in which the operating piece member 15 is pushed to the left side), and the transmission rollers 12 come into contact with the carrier rollers 3.

Next, an explanation will be given of the operation of the above example.

When all the object detectors 23 do not detect the object W, all the carrier rollers 3 of all the zones 5 are rotating.

When an object detector 23 detects the object W in transportation, all the operating devices 16 of the zones 5 succeeding to the zone 5 to which the object detector 23 belongs are in a nonoperating state, and the rotation of all the carrier rollers 3 in the succeeding zones 5 is stopped. Therefore, a succeeding object W is stopped once before colliding with a preceding object W when there is the preceding object W just in front thereof. Accordingly, the succeeding object W does not push the preceding object W or collide with the preceding object W.

When the object W at the preceding zone 5 is transported out, the operating devices 16 of the succeeding zones 5 recover to operate in the initial state, the object W which has been in the stop state as stated above, is again transported in the forward direction.

Further, each carrier roller 3 may be provided with each transmission roller 12 at the lower side thereof.

This invention achieves the following effects by the above-mentioned construction.

① Only the rotation of desired rollers can simply be stopped by vertically moving the transmission rollers.

② Only the rotation of the desired rollers can simply be stopped without considerably increasing the number of motors, and therefore, the cost is low.

Further, according to the present invention, the rotation by inertia of the carrier rollers from which the transmission rollers are separated can be prevented, whereby the collision of the succeeding object with the preceding object can be positively prevented.

Further, in the invention of claim 3 especially, the brake shoes 14 are always forced to come into contact with the rollers 3 by using the carrier endless belts 20 which extend around the driving rotation shaft 10 and the wheels 13 of the transmission rollers 12, and therefore it is not necessary to provide independent means for operating the brake shoes 14 and the construction can be made simple.

What is claimed is:

1. A roller driving device comprising:

a base frame;

a carrier roller mounted in said base frame for rotation about a central axis;

a driving rotation shaft disposed below said carrier roller;

a bearing member disposed beneath said carrier roller;

a pivot shaft disposed perpendicularly with respect to said central axis of said carrier roller and mounting said bearing member for pivotal movement;

a transmission roller and a wheel concentric thereto rotatably carried by said bearing member on one side of said pivot shaft;

a brake shoe carried by said bearing member on the other side of said pivot a an endless belt extending around said wheel and the driving rotation shaft for rotating said transmission roller; and means for pivoting said bearing member about said pivot shaft to place either said transmission roller or said brake shoe alternatively in contact with said carrier roll.

2. The roller driving device according to claim 1, wherein said transmission roller and said endless belt about said wheel operate to pivot said bearing member to normally bias said brake shoe into contact with said carrier roller.

3. The roller driving device according to claim 1 wherein said bearing member pivoting means includes a reversibly movable operating member operable when actuated to engage an operating member on said bearing member for pivoting said bearing member to place said transmission roller in contact with said carrier roller.

4. A roller driving device according to claim 1 wherein said carrier rollers are arranged in pairs and said bearing member is positioned between the carrier rollers in the pair whereby, when said bearing member is pivoted in one direction, said transmission roller operably engages both of said carrier rollers in said pair and, when said bearing member is pivoted in the other direction, said brake shoe is operable to engage both of said carrier rollers in said pair.

* * * * *